United States Patent [19]

Hyams et al.

[11] 4,128,024

[45] * Dec. 5, 1978

[54] FUSE-MATE

[75] Inventors: Irving Hyams, Philadelphia; Harold S. Koch, Plymouth Meeting; Herman C. Aafjes, Hatfield, all of Pa.

[73] Assignee: Fischer & Porter Co., Warminster, Pa.

[ * ] Notice: The portion of the term of this patent subsequent to Jun. 13, 1995, has been disclaimed.

[21] Appl. No.: 845,588

[22] Filed: Oct. 26, 1977

Related U.S. Application Data

[63] Continuation-in-part of Ser. No. 785,526, Apr. 7, 1977, Pat. No. 4,094,212.

[51] Int. Cl.[2] .......... B23P 17/00
[52] U.S. Cl. .......... 81/3.8
[58] Field of Search .......... 81/3.8

[56] References Cited

U.S. PATENT DOCUMENTS

| | | | |
|---|---|---|---|
| 1,922,500 | 8/1933 | Pierce | 81/3.8 X |
| 3,654,824 | 4/1972 | Reed | 81/3.8 |

*Primary Examiner*—Al Lawrence Smith
*Assistant Examiner*—James G. Smith
*Attorney, Agent, or Firm*—Michael Ebert

[57] ABSTRACT

A mating device for a cartridge-type fuse to facilitate its insertion in a holder and the removal therefrom. The fuse has a tubular casing whose ends are enclosed by terminal caps which are engageable by the spring clips of the holder. The fuse mate is molded of synthetic plastic material configured to define a block-shaped socket having a longitudinal channel therein adapted to accommodate the tubular casing of the fuse and lateral inlet jaws which are dilatable to admit the casing into the channel, the socket being integral with the underside of a rectangular shield which protectively covers the entire fuse and the "live" holder clips. Formed on the upper side of the shield and integral therewith is a handle having concave sides to define finger depressions and a face which lends itself to marking.

6 Claims, 6 Drawing Figures

FUSE-MATE

RELATED APPLICATION

This application is a continuation-in-part of our copending application Ser. No. 785,526, filed Apr. 7, 1977, and entitled "Fuse Mate," now U.S. Pat. No. 4,094,212.

BACKGROUND OF INVENTION

This invention relates generally to cartridge-type electrical fuses, and more particularly to a mating device which facilitates insertion of such fuses into a fuse holder and the removal thereof, the fuse-mate also carrying out other useful functions.

A fuse is a protective device containing a short length of special wire that melts when the current therethrough exceeds the rated value for a given period. Because the fuse is inserted in series with the circuit to be protected, it opens this circuit automatically in the event of an unacceptable overload.

The fuse commonly used in conjunction with electronic equipment is of the so-called cartridge type. This is constituted by a tubular casing of glass or other clear insulating material whose ends are enclosed by metal terminal caps, the fuse wire extending through the casing and bridging the caps. Since the fuse wire is visible through the transparent casing, should an overload occur which melts the wire, the blown condition of the fuse then becomes evident. In some cases, the casing is of opaque or ceramic material.

Cartridge fuses are socketed in holders formed by an insulating base on which a pair of metal spring clips is mounted to engage the terminal caps of the fuse, the circuit connections being made to the clips. In many instances, an array of parallel holders are formed on a common base so that the fuses are then very close to each other. Normally, to install a fuse, one grips the casing thereof between the thumb and forefinger and then pushes the fuse into the holder clips. And to remove a fuse from the holder, one again grips the casing with the fingers to pull the fuse from the holder clips.

To insure efficient electrical contact between the holder clips and the fuse terminal caps, the clips are designed to apply a substantial clamping pressure on the caps. These pressures make insertion and removal of the fuse quite difficult, which difficulty is compounded when the fuses are small or where a family of fuses are very close to each other. Moreover, because at least one holder clip is alive, and the gripping fingers are quite close to the terminal caps, there is a danger of shock, particularly if resistance is experienced in removing or inserting a fuse in the course of which the fingers are shifted toward the caps.

Because of problems encountered in removing cartridge type fuses, the use of screw drivers to pry the fuse from the holder is not uncommon. This can lead not only to fracture of the relatively delicate fuse casing, but it may also result in the short-circuiting of adjacent fuse holders.

In our copending application, above-identified, there is disclosed a fuse-mate adapted to facilitate the insertion and removal of a cartridge-type fuse. This fuse-mate, which is highly compact, may be permanently clipped onto a fuse whereby even when an array of fuses is arrayed in holders placed in close proximity to each other, there is no interference between adjacent mated fuses, and any mated fuse may be inserted or withdrawn from the array without difficulty.

A fuse-mate of the type disclosed in our copending application is molded of synthetic plastic material having good insulating properties and adequate structural strength, the fuse mate being configured to define a pair of elongated resilient clip-on jaws whose length is slightly shorter than the length of the tubular casing of the fuse to be engaged thereby between the end caps, the jaws being adapted to spread apart and embrace the casing.

The jaws project below and are integral with the underside of a rectangular shield which protectively covers the entire fuse and the "live" electrical holder clips thereunder to obviate the danger of shock. Formed on the upper side of the shield and integral therewith is a handle having concave sides to define finger depressions and a face which lends itself to marking.

In a fuse-mate of the type disclosed in our copending application, the jaws must have sufficient flexibility to make it possible to snap the fuse between the jaws. When one seeks to manually extract from its holder a cartridge fuse coupled to the fuse-mate, the outward force then applied to the handle of the fuse-mate will act to dilate the flexible jaws if the holder refuses to release the fuse. This situation arises should the spring clips of the holder be so tight as to resist flexing when one applies an outward pulling force to the fuse-mate. Thus instead of extracting the fuse, the jaws of the fuse-mate are then disengaged from the fuse which stays behind in the holder.

To overcome this problem, the fuse-mate may be designed with stiffened jaws so that the jaws firmly grip the tubular casing and are not disengaged therefrom when an outward pulling force is applied. But a structure of this type has a disadvantage, for it then becomes difficult to snap the fuse into the jaws of the fuse-mate.

SUMMARY OF INVENTION

In view of the foregoing, the main object of this invention is to provide an improved fuse-mate adapted to facilitate the insertion and removal of a cartridge-type fuse.

More particularly, it is an object of this invention to provide a fuse-mate which may be readily snapped onto a fuse and yet functions to extract the fuse from its holder even when the clips of the holder are very tight, the fuse mate being highly compact whereby when an array of fuses is held in holders placed in close proximity to each other, there is no interference between adjacent mated fuses, and any mated fuse may be inserted or withdrawn from the array thereof without difficulty.

A significant feature of an improved fuse-mate in accordance with the invention is that it functions not only to facilitate the insertion of a fuse into its holder and the removal of the fuse therefrom, but also acts as a shield to protectively cover the fuse and the underlying "live" terminal clips to obviate the danger of electrical shock.

Another advantage of the fuse-mate is that its handle is provided with a face which lends itself to marking with the rating of the fuse held thereby, so that when a fuse is blown, one then knows the rating of the necessary replacement. Alternatively, the rating may be marked on the shield. Yet another advantage of the fuse-mate is that when the fuse clamped therein is visually examined, the fuse wire within the clear casing is seen against an opaque background, and its condition is more readily discernible.

Also an object of the invention is to provide a fuse-mate molded of synthetic plastic material, which fuse-mate may be mass-produced at low cost, such that, as a practical matter, one can afford to discard a fuse-mate coupled to a blown fuse rather than retain the mate and replace the fuse therein. Consequently, fuses of a given rating may be coupled at the factory with fuse-mates which are labelled with their ratings, and these mated fuses may be appropriately packaged so that the user has no need to install a fuse in a fuse-mate. When the occasion arises, the user simply replaces a blown mated fuse with a fresh one. Thus both the fuse and the mate therefor are disposable.

Briefly stated, these objects are attained in a fuse-mate molded of synthetic plastic material having good dielectric properties and adequate structural strength, the fuse-mate being configured to define a block-like socket having a longitudinally-extending channel therein adapted to accommodate the tubular casing of a cartridge fuse and lateral inlet jaws which are dilatable to permit the casing to be snapped into the channel and to be held therein.

The upper surface of the socket is integral with the underside of a rectangular shield which extends over the terminal caps of the socketed fuse and protectively covers the entire fuse and the "live" clips of its holder. Formed on the upper side of the shield is a handle having concave sides to define finger depressions and a face which lends itself to marking.

Because the lower surface of the socket serves as a shelf underlying the fuse held in the channel, an outward pulling force will not dislodge the fuse from the socket even if the fuse is tightly gripped by thd holder clips and will serve to withdraw the fuse from the holder.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
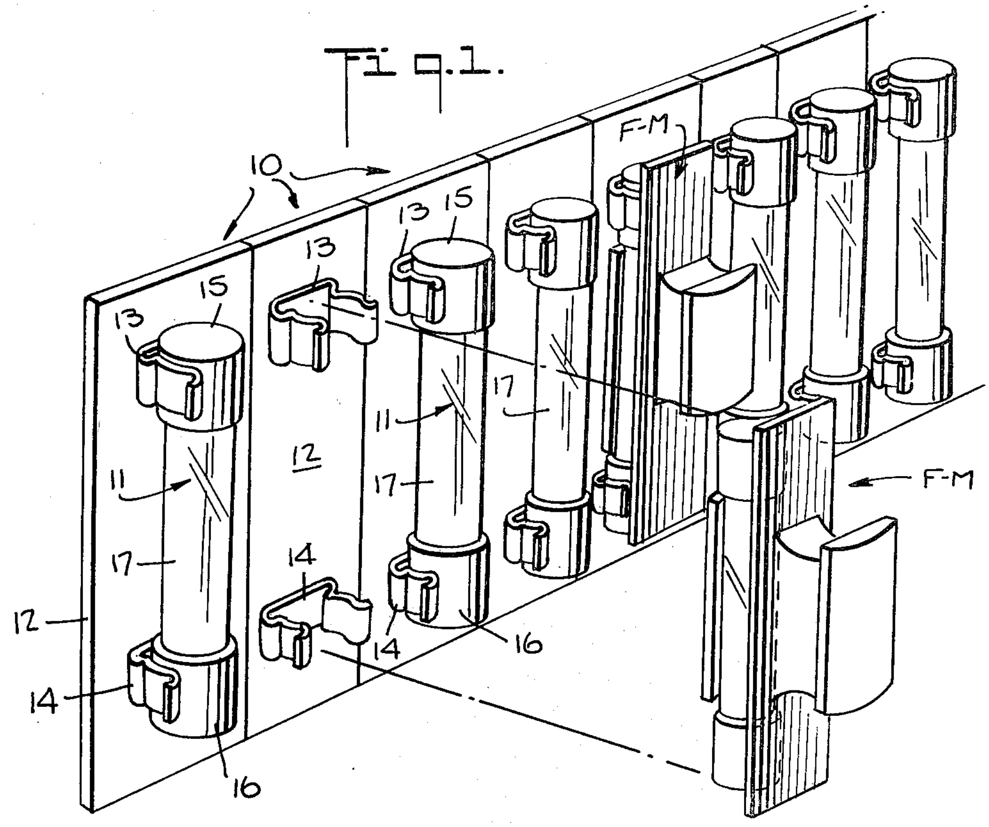
FIG. 1 is a perspective view of an array of standard holders for cartridge-type fuses, some of the holders having fuses therein which are coupled to improved fuse-mates in accordance with the invention.
Figure 3:
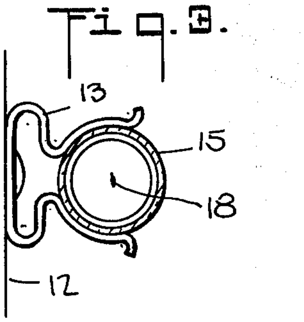
FIG. 3 is a transverse section taken through a fuse held by spring clips of a holder.
Figure 4:
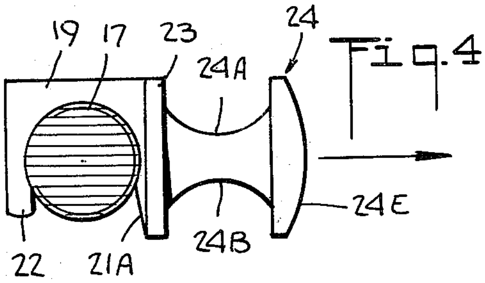
FIG. 4 shows in transverse section the fuse-mate coupled to the fuse.

Referring now to FIG. 1, there is shown an array of standard fuse holders, generally designated by numeral 10, one directly against the other so that the cartridge-type fuses 11 retained in the holders are in close proximity to each other. As previously explained, in a typical piece of electronic equipment having several protective fuses in a range of ratings appropriate to the equipment, an array of this type is not uncommon and present difficulties in removing and replacing individual fuses.

Each holder 10 is constituted by a rectangular insulating base 12 on which is mounted a pair of metal clips 13 and 14 at spaced positions. These clips are formed with spring fingers adapted to engage and to electrically connect with the terminal caps 15 and 16 enclosing the ends of the transparent tubular casing 17 of the cartridge fuse. A fuse wire 18 is disposed within the casing, the wire bridging end caps 15 and 16.

Clips 13 and 14 are electrically "live," since they are connected to the electrical circuit which is to be protected against an excessive overload. In the event of an excessive overload—that is, one exceeding the rating of the fuse—the wire is caused to melt to break the circuit and interrupt the flow of current therethrough.

The one-piece mate for the fuse is generally designated as F-M and is molded of a synthetic plastic material, such as polyethylene, having good dielectric properties and some degree of resilience. Fuse-mate F-M is configured to define a block-shaped socket 19 of square cross-section having a longitudinal channel 20 formed therein which is contoured to conform to the cylindrical surface of fuse casing 17. The channel is provided with a lateral inlet formed by upper and lower jaws 21 and 22. When fuse casing 17 is forced between jaws 21 and 22 of the inlet, the jaws yield to permit entry of the casing into channel 20, the jaws then reverting to their normal state to lock the casing within the channel. Jaw 21 is provided with a leading edge ramp 21A to facilitate the admission of the fuse.

The upper surface of socket 19 is integral with the underside of a rectangular shield 23 whose length is somewhat greater than the length of the cartridge casing held in channel 20 and whose width is somewhat greater than the width of the fuse so that the shield overlies the end caps 15 and 16 and acts to protectively cover the fuse and the "live" holder clips thereunder.

Formed on the outer surface of shield 23 is a handle 24, the width of the handle being the same as that of the shield, the length of the handle being shorter than that of the shield and being centered thereon. The opposing sides 24A and 24B of handle 24 and the opposing ends 24C and 24D thereof are concave to form finger depressions to facilitate handling of the fuse-mate from any direction. Handle 24 is provided with a slightly convex face 24E onto which one may adhere a label that bears rating and other data which is then readily viewable by the user. Or the rating may be marked on shield 23.

Figure 2:
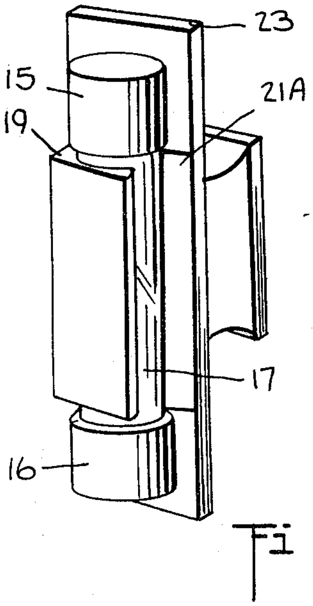
FIG. 2 shows in perspective a single fuse coupled to a fuse-mate.
Figure 5:
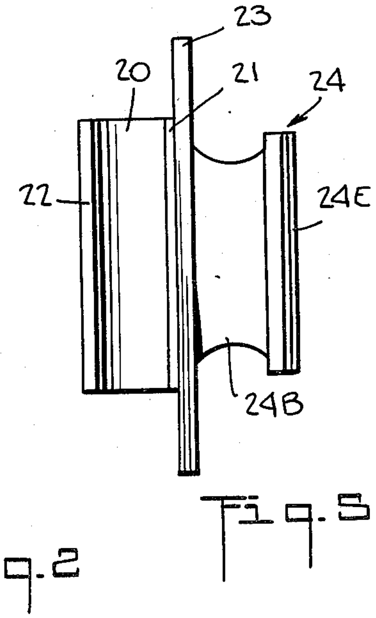
FIG. 5 is a side view of the fuse-mate.
Figure 6:
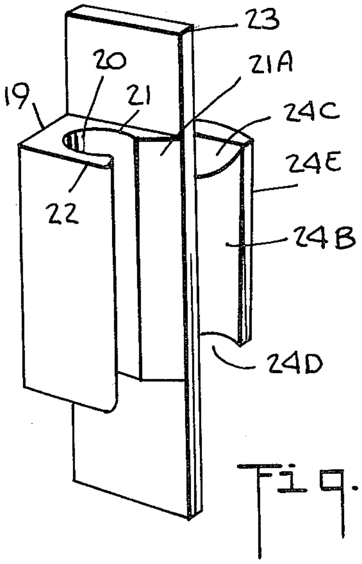
FIG. 6 is a bottom view of the fuse-mate.

Thus when a fuse 11 is coupled to a fuse-mate F-M in the manner shown in FIGS. 1 and 2, it becomes possible to insert the fuse into a standard holder therefor or to extract the fuse from the holder without difficulty and without any danger of finger contact with the "live" clips of the holder; for the fingers are well isolated from the end caps of the fuse and the holder clips. One may therefore insert or remove a fuse in poor light without fear of shock.

Because the lower surface of socket 19 forms a shelf under fuse casing 17, an outward pulling force applied to the fuse-mate in order to extract the fuse from its holder will not act to dilate jaws 21 and 22 of the lateral inlet; for in order to effect such dilation, one must insert a fuse into the jaws in a direction normal to the outward pulling force. Hence even if the holder clips are tight and resist extraction, a heavy pulling force can be used to overcome this resistance without disengaging the fuse-mate from the fuse.

Fuse mate F-M is formed of opaque material which may be white or in different colors. Hence, rather than label the ratings of the fuses on the fuse-mate, the fuse-mates may be color-coded to represent different ratings, such as red for 0.25 amps, green for 0.50 amps, and so on. When, as shown in FIG. 2, one wishes to examine the condition of fuse wire 18 in the fuse to determine whether the fuse is blown, one then sees this wire within the clear casing 17 against the opaque background of the mate, and its state is therefore more readily discernible.

In practice, one may use a single fuse-mate as a tool to insert fuses into holders or to extract fuses therefrom; in which event, when a blown fuse is located and extracted, it must be detached from the mate and a fresh fuse coupled thereto. However, since the fuse-mates can be fabricated in quantity at very low cost, the fuse-mates may be coupled at the factory to appropriate fuses and supplied to users as couples; in which event the couples are installed in the fuse holders and remain therein until it is necessary to replace a blown fuse, in which case the blown couple is removed and discarded and a fresh couple put in place.

Since fuse cartridges come in various diameters and lengths, their companion fuse-mates must be dimensioned accordingly. It is also to be noted that cartridge fuses in large ratings often come with casings made of fibrous material rather than glass or clear plastic, and that one can provide fuse-mates appropriate to these sizes.

While there has been shown and described a preferred embodiment of an improved fuse-mate in accordance with the invention, it will be appreciated that many changes and modifications may be made therein without, however, departing from the essential spirit thereof.

I claim:

1. A fuse-mate formed of insulating material and adapted to be coupled to a cartridge-type fuse having a cylindrical casing whose ends are enclosed by terminal caps, said caps being engageable by the spring clips of a fuse holder, said fuse-mate facilitating the insertion or extraction of said fuse with respect to said holder and comprising:

A. a block-shaped socket whose length is substantially equal to that of said casing, said socket having a longitudinally-extending channel formed therein adapted to accommodate said fuse casing, and lateral inlet jaws which are dilatable under pressure to admit an inserted casing into the channel, the jaws then reverting to their normal position in which they serve to lock the casing within the channel;

B. a shield whose underside is secured to the upper surface of the socket and extending beyond either end thereof to overlie and protectively cover the caps of the socketed fuse; and C. a handle secured to the upper side of the shield, the lower surface of said block defining a shelf to maintain said fuse in said channel when an outward pulling force applied to said handle to extract said fuse from the holder is resisted by said spring clips.

2. A fuse-mate as set forth in claim 1, wherein said shield, said socket and said handle are integral with each other and are fabricated from a single molded piece of synthetic plastic material.

3. A fuse-mate as set forth in claim 1, wherein said casing is of transparent material and said fuse-mate is of opaque material whereby the wire in said casing may be readily seen against an opaque background to determine its condition.

4. A fuse-mate as set forth in claim 1, wherein the sides and ends of said handle are concave to define finger depressions.

5. A fuse-mate as set forth in claim 4, wherein said handle has a substantially flat face to receive a marking label.

6. A fuse-mate as set forth in claim 1, wherein the leading edge of one of the jaws has a ramp formation to facilitate insertion of the fuse.

* * * * *